United States Patent [19]

Leigh-Monstevens et al.

[11] Patent Number: 5,014,038

[45] Date of Patent: May 7, 1991

[54] MOTOR VEHICLE CONTROL SYSTEM

[75] Inventors: Keith V. Leigh-Monstevens, Troy; David C. Peterson, Walled Lake; Brian Mabee, Warren, all of Mich.

[73] Assignee: Automotive Products (USA) Inc., Sterling Heights, Mich.

[21] Appl. No.: 323,825

[22] Filed: Mar. 15, 1989

Related U.S. Application Data

[63] Continuation-in-part of Ser. No. 95,856, Sep. 14, 1987, Pat. No. 4,841,793.

[51] Int. Cl.$^5$ .................. B60R 25/10; G08B 21/00
[52] U.S. Cl. .................................. 340/430; 180/287; 340/456
[58] Field of Search ............... 340/430, 456; 180/287, 180/337, 315, 271, 272, 337

[56] References Cited

U.S. PATENT DOCUMENTS

| | | | |
|---|---|---|---|
| 2,281,734 | 5/1942 | Whittaker | 171/97 |
| 2,634,622 | 4/1953 | Cripe | 74/335 |
| 3,277,734 | 10/1966 | Bernard | 74/335 |
| 3,566,632 | 3/1971 | Southfield et al. | 70/248 |
| 3,573,582 | 4/1971 | Petrocelli | 318/305 |
| 3,802,531 | 4/1974 | Schiesterl | 180/114 |

(List continued on next page.)

FOREIGN PATENT DOCUMENTS

| | | |
|---|---|---|
| 0134646 | 3/1985 | European Pat. Off. . |
| 0300911 | 7/1988 | European Pat. Off. . |
| 0310275 | 4/1989 | European Pat. Off. . |
| 0310387 | 4/1989 | European Pat. Off. . |
| 0316300 | 5/1989 | European Pat. Off. . |
| 0316301 | 5/1989 | European Pat. Off. . |
| 0316302 | 5/1989 | European Pat. Off. . |
| 0316303 | 5/1989 | European Pat. Off. . |
| 0328299 | 8/1989 | European Pat. Off. . |
| 0328362 | 8/1989 | European Pat. Off. . |
| 3827660 | 3/1989 | Fed. Rep. of Germany . |
| 56-49685 | 5/1981 | Japan . |
| 58-13764 | 8/1983 | Japan . |
| 60-40850 | 3/1985 | Japan . |
| 89/03319 | 4/1989 | PCT Int'l Appl. . |
| 1295060 | 11/1972 | United Kingdom . |
| 1455606 | 11/1986 | United Kingdom . |

OTHER PUBLICATIONS

SAE Paper 845094.
SAE Paper 810949.
SAE Paper 831776.
SAE Paper 840448.
SAE Paper 850289.
SAE Paper 850782.
SAE Paper 860652.
SAE Paper 861170.

(List continued on next page.)

*Primary Examiner*—Glen R. Swann, III
*Attorney, Agent, or Firm*—Krass & Young

[57] ABSTRACT

An electronic control system for a motor vehicle of the type including an automatic transmission, a steering system having a steering column, an ignition switch having an on position and a key-in/lock position, means operative in response to movement of the ignition switch to the key-in/lock position to lock the steering column, a starter circuit, a push button shift control assembly in the vehicle passenger compartment, and a closure system requiring one or more operator steps to enter the vehicle passenger compartment. The invention control system includes means to preclude movement of the ignition switch to the key-in/lock position when the vehicle speed is in excess of a predetermined speed; means for generating a coded anti-theft signal comprising a predetermined combination of shift assembly push buttons depressed in a predetermined sequence to allow starting of the motor vehicle and to allow shifting of the motor vehicle; and means operative to display the instantaneous position of the vehicle transmission during the normal operation of the vehicle, for a predetermined period of time following removal of the ignition key from the ignition switch, and for a predetermined time following operator performance of one or more of the steps required to enter the vehicle passenger compartment.

32 Claims, 4 Drawing Sheets

U.S. PATENT DOCUMENTS

| | | | |
|---|---|---|---|
| 3,937,105 | 2/1976 | Arai et al. | 74/846 |
| 3,942,614 | 3/1976 | Thompson | 192/4 A |
| 4,065,983 | 1/1978 | Mimura | 74/625 |
| 4,232,538 | 11/1980 | Detloff, Jr. | 70/239 |
| 4,246,990 | 1/1981 | Strantz | 192/4 C |
| 4,250,976 | 2/1981 | Mochida | 180/271 |
| 4,262,783 | 4/1981 | Scarrott et al. | 192/0.09 |
| 4,271,728 | 6/1981 | Wakamatsu | 74/866 |
| 4,275,618 | 6/1981 | Bale | 74/878 |
| 4,291,586 | 9/1981 | Buetemeister | 74/335 |
| 4,312,248 | 1/1982 | Sugimoto et al. | 74/861 |
| 4,324,153 | 4/1982 | Sugimoto et al. | 74/866 |
| 4,324,322 | 4/1982 | Sibeud | 192/0.032 |
| 4,332,306 | 6/1982 | Turatti | 180/287 |
| 4,339,962 | 7/1982 | Babel | 74/335 |
| 4,428,248 | 1/1984 | Broucksau et al. | 74/335 |
| 4,493,228 | 1/1985 | Vukovich et al. | 74/858 |
| 4,495,457 | 1/1985 | Stahl | 364/424.1 |
| 4,520,640 | 6/1985 | Kramer | 70/248 |
| 4,541,609 | 9/1985 | Smith | 251/129.03 |
| 4,558,612 | 12/1985 | Shimizu et al. | 74/844 |
| 4,570,765 | 2/1986 | Makita | 192/139 |
| 4,583,171 | 4/1986 | Hara et al. | 364/424 |
| 4,602,528 | 7/1986 | Bailey | 74/861 |
| 4,621,328 | 11/1986 | Arai et al. | 364/424.1 |
| 4,638,690 | 1/1987 | Hattori et al. | 74/866 |
| 4,638,882 | 1/1987 | Sato | 180/287 |
| 4,639,646 | 1/1987 | Harris et al. | 318/139 |
| 4,664,217 | 5/1987 | Welch et al. | 180/247 |
| 4,682,062 | 7/1987 | Weinberger | 180/287 |
| 4,785,615 | 11/1988 | Leigh-Monstevens | 340/456 |
| 4,821,607 | 4/1989 | Kawai | 74/866 |
| 4,823,643 | 4/1989 | Koshizawa | 74/866 |
| 4,825,831 | 5/1989 | Kawai | 123/360 |
| 4,825,993 | 5/1989 | Kurihara et al. | 192/0.092 |
| 4,841,815 | 6/1989 | Takahashi | 74/866 |
| 4,848,529 | 7/1989 | Kurihara et al. | 192/0.076 |
| 4,849,899 | 7/1989 | Cote et al. | 364/424.01 |
| 4,892,014 | 1/1990 | Morell et al. | 74/866 |

OTHER PUBLICATIONS

SAE Paper 820392.
SAE Paper 820909.
SAE Paper 820920.
SAE Paper 830880.
SAE Paper 841307.
SAE Paper C247/85.
SAE Paper 852292.
SAE Paper 845094.
SAE Paper 861050.
Article entitled "Allison Transmissions Electronic Control for On-Highway Applications".

FIG. 5

MOTOR VEHICLE CONTROL SYSTEM

REFERENCE TO RELATED APPLICATIONS

This application is a continuation-in-part of U.S. patent application Ser. No. 095,856 filed Sept. 14, 1987 now U.S. Pat. No. 4,841,793, issued June 27, 1989.

BACKGROUND OF THE INVENTION

This invention relates to control systems for motor vehicles and more particularly to a control system for a motor vehicle offering various safety and convenience features.

The modern day motor vehicle is a sophisticated item of machinery offering many comforts, safety, and convenience features. However, the modern day motor vehicle continues to exhibit certain disadvantageous aspects. Specifically, the modern day motor vehicle is still subject in certain circumstances to accidental locking of the steering column with the vehicle in motion with often catastrophic consequences; the modern day motor vehicle is still subject to theft especially on the part of professional thieves; and the modern day motor vehicle does not always satisfy the desired feature of clearly indicating the transmission state of the vehicle to the operator in all operational modes of the vehicle.

SUMMARY OF THE INVENTION

This invention is directed to the provision of a motor vehicle having improved safety, comfort and convenience aspects.

This invention is further directed to the provision of a motor vehicle having improved means to preclude inadvertent locking of the motor vehicle steering column.

This invention is further directed to the provision of a motor vehicle having improved anti-theft protection This invention is further directed to the provision of a motor vehicle having improved means for displaying the instantaneous transmission position.

In one aspect of the invention, the invention is directed to a control system for a motor vehicle of the type including a steering system having a steering column, an ignition switch having an on position and a key-in/key-out position, and means operative in response to movement of the ignition switch to the key-in/key-out position to lock the steering column.

According to this aspect of the invention, the control system comprises sensor means operative to sense the vehicle speed and generate a speed signal and control means receiving the speed signal and operative in response to a sensed vehicle speed in excess of a predetermined value to preclude movement of the ignition switch to the key-in/key-out position. This arrangement ensures that the ignition switch will not be moved inadvertently to a column lock position while the vehicle is in motion.

According to a further feature of this aspect of the invention, the control means includes blocking means movable into and out of the path of movement of the ignition switch in response to the received speed signal. This arrangement provides a simple means of precluding the undesired or inadvertent movement of the ignition switch to a position allowing locking of the steering column.

According to a further feature of this aspect of the invention, the blocking means comprises an electrical actuator which is actuated and deactuated in response to the received speed signal. This arrangement provides a blocking system for the ignition switch compatible with an electronic control system.

According to a further feature of this aspect of the invention, the actuator comprises a solenoid energized and deenergized in response to the speed signal and having its plunger arranged to move into and out of the path of movement of the ignition switch. This arrangement allows a readily available, inexpensive and reliable electrical element to perform the desired blocking movement of the ignition switch.

According to a further feature of this aspect of the invention, the vehicle further includes an automatic transmission of the type including a transmission state of park, the ignition switch includes an off position between the key-in/key-out position and the on position, the control means comprises a control logic receiving the speed signal, the control logic is operative in response to movement of the ignition switch to the off position to shift the transmission to park if the received speed signal indicates a vehicle speed no greater than the predetermined speed, and the blocking means is moved out of the path of movement of the ignition switch in response to shifting of the transmission to the transmission state of park. This arrangement prevents movement of the transmission to the transmission state of park until the vehicle speed has dropped below the predetermined speed and precludes movement of the ignition switch to the column lock position until the transmission has achieved the transmission state of park, thereby effectively precluding movement of the ignition switch to the column lock position so long as the vehicle speed exceeds the predetermined speed.

In a further aspect of the invention, a control system is provided for a motor vehicle of the type including a transmission having a plurality of shift positions.

According to this aspect of the invention, the control system includes a transmission shift assembly including a plurality of operator selected positions corresponding respectively to each transmission shift position; generator means operative in response to operator selection of a shift assembly position to generate an operator signal representative of the selected shift assembly position; operator actuated means for generating an anti-theft code signal; and control means, including a control logic receiving the operator shift signals and the anti-theft code signal, operative upon receipt of an operator selected position signal and the anti-theft code signal to shift the transmission to the shift position corresponding to the operator selected position and inoperative to shift the transmission in the absence of receipt of the anti-theft code signal. This arrangement allows the provision of an effective anti-theft feature as a simple and inexpensive addendum to an existing electronic control logic system for the vehicle.

According to a further feature of this aspect of the invention, the motor vehicle further includes a starter circuit, including an ignition switch, to enable starting of the engine of the motor vehicle upon closing of the ignition switch, and the control system is further operative to disable the starter circuit in the absence of the anti-theft code signal. This arrangement, which is again available as a simple and inexpensive addendum to an existing electronic control logic system, provides a further theft deterrent feature.

According to a further feature of this aspect of the invention, the shift assembly includes a pushbutton module including a push button corresponding to each transmission shift position, and the operator actuated means for generating an anti-theft code signal includes the push button module in combination with a sequential logic circuit connected to the push-button module and operative in response to operator depression of selected push buttons in a predetermined sequence to generate the anti-theft code signal. This arrangement allows the generating means for the anti-theft code signal to be constituted by existing equipment in the situation where the vehicle is already equipped with a push-button shift selector assembly for the transmission.

According to a further feature of this aspect of the invention, the motor vehicle includes a passenger compartment closure system requiring one or more operator steps to enter the vehicle passenger compartment and the control system further includes alarm means activated upon failure of the operator to generate the anti-theft code signal within a predetermined time after operator performance of one or more of the steps required to enter the vehicle passenger compartment. This arrangement again allows the provision of a further theft deterrent feature as an inexpensive addendum to an existing electronic control logic system for the vehicle.

In a further aspect of the invention, the motor vehicle is of the type having an automatic transmission, a gear selector assembly operative to select a desired transmission position, an ignition switch having an on position and a key removal position, and a passenger compartment closure system requiring one or more operator steps to enter the vehicle passenger compartment.

According to a feature this aspect of the invention, the control system includes indicator means operative with the vehicle ignition in the on position or in the key removal position to display the instantaneous position of the transmission as selected by the gear selector assembly; time delay means operative to display the instantaneous position of the transmission for a predetermined time after movement of the ignition switch to the key removal position and removal of the key; and means operative in response to operator performance of one or more of the steps required to enter the vehicle to activate the indicator means to display the instantaneous position of the transmission. This arrangement provides a constant display of the transmission position to the operator, assures the operator that the transmission is in a desired position as the operator leaves the vehicle, and provides assurance to the operator that the transmission is in the desired position as the operator again accesses the vehicle.

According to a further feature of this aspect of the invention, the transmission has a transmission state of park; the ignition switch has an off position; the control system includes means operative to shift the transmission to the transmission state of park in response to movement of the ignition switch to the off position; and the indicator means is operative with the vehicle ignition in the off position. This arrangement assures that the transmission state of park will be displayed when the ignition switch is moved to the off position, ensures that the state of park will continue to be displayed as the ignition switch is moved to the key removal position, further ensures that the park position will continue to be displayed for the predetermined period of time after removal of the key, and further ensures that the park position will again be displayed in response to operator performance of one or more of the steps required to enter the vehicle passenger compartment.

According to a further feature of this aspect of the invention, the time delay means is further operative to maintain the indicator means in an activated state for a predetermined entry time following operator performance of one or more of the steps required to enter the vehicle passenger compartment. This arrangement ensures that the transmission state of park will be displayed for the predetermined entry time and will remain displayed provided the key is inserted into the ignition within the predetermined entry time.

According feature of this aspect of the invention, the indicator means is operative when activated to display the instantaneous position of the transmission in a window in the instrument panel of the vehicle. This arrangement provides the operator with a display of the instantaneous position of the transmission directly in his line of sight.

According to a further feature of this aspect of the invention, the indicator means is further operative to display the instantaneous position of the transmission by a visual signal adjacent the selected position of the gear selector assembly. This arrangement provides a second independent display to the operator with respect to the instantaneous position of the transmission.

DETAILED DESCRIPTION OF THE PREFERRED EMBODIMENT

Figure 1:
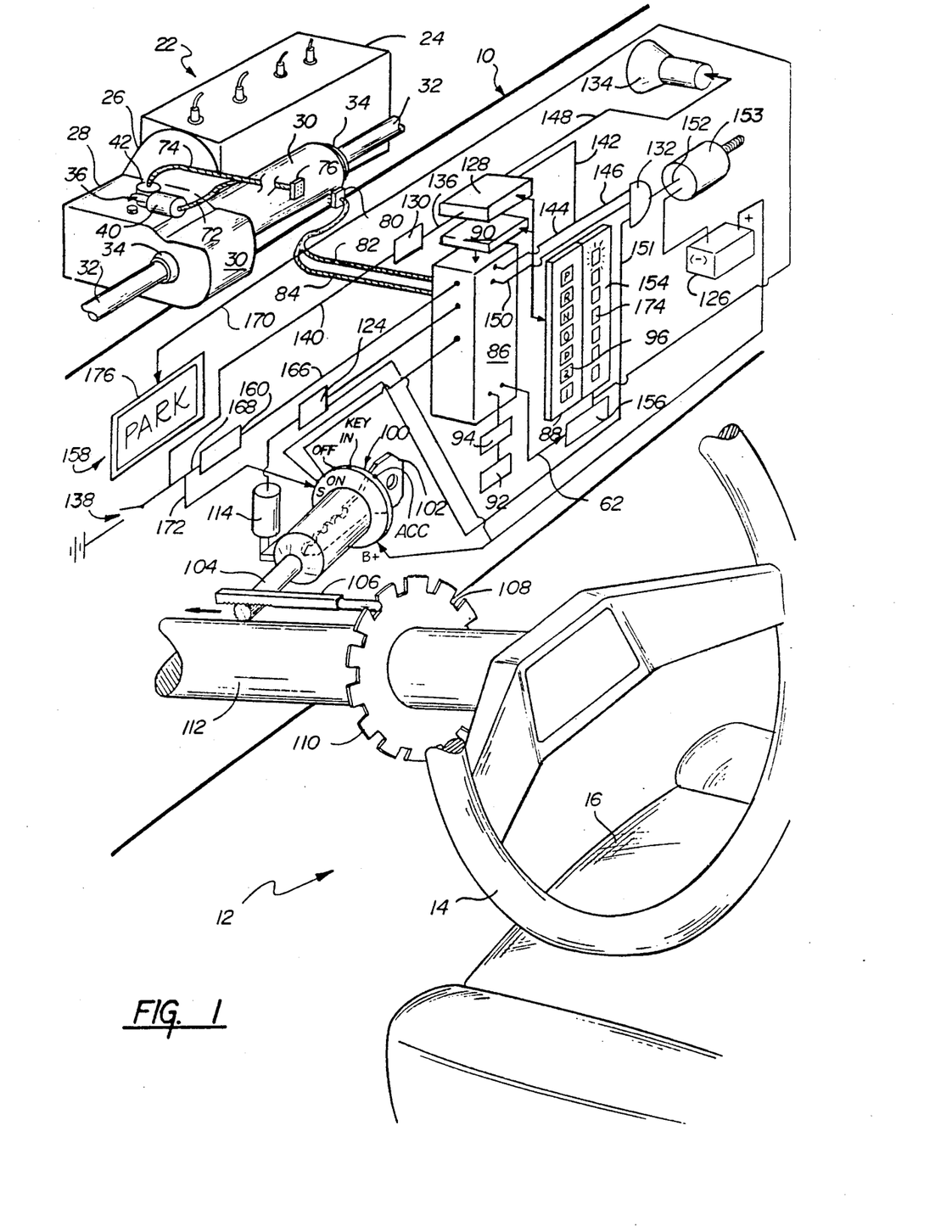
FIG. 1 is a fragmentary perspective schematic view of a motor vehicle employing a control system according to the invention.
Figure 3:
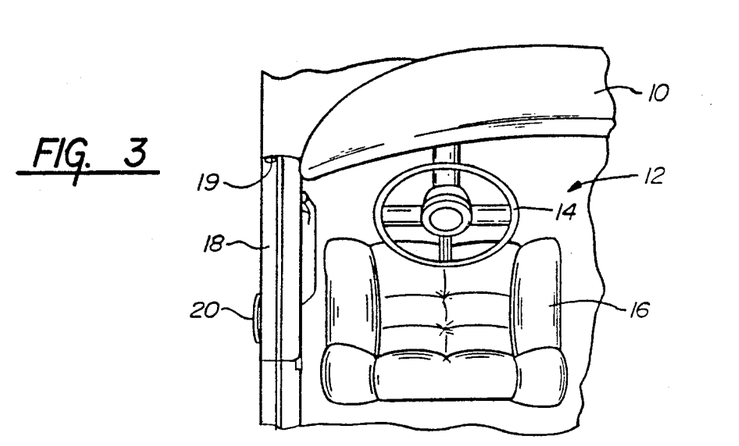
FIG. 3 is a fragmentary plan view of a motor vehicle utilizing the invention control system.

The invention control system is seen schematically in FIGS. 1 and 3 in association with a motor vehicle of the front wheel drive type and including an instrument panel assembly 10 positioned within the passenger compartment 12 of the motor vehicle; a steering wheel 14 associated with the instrument panel; an operator seat 16; a door 18 mounted for pivotal opening and closing movement about a front hinge axis 19 and having a door handle 20 actuating a door latching mechanism (not shown) of known form to allow pivotal opening movement of the door about hinge axis 19 in response to movement of handle 20; and a front wheel drive assembly 22.

Front wheel drive assembly 22 includes an internal combustion engine 24 mounted transversely in the engine compartment of the vehicle, a torque converter 26 driven by engine 24, a gear drive assembly 28, an automatic transmission 30, drive shafts 32 drivingly connected to the opposite ends of transmission 30 by joints 34, and a power module 36.

Figure 4:
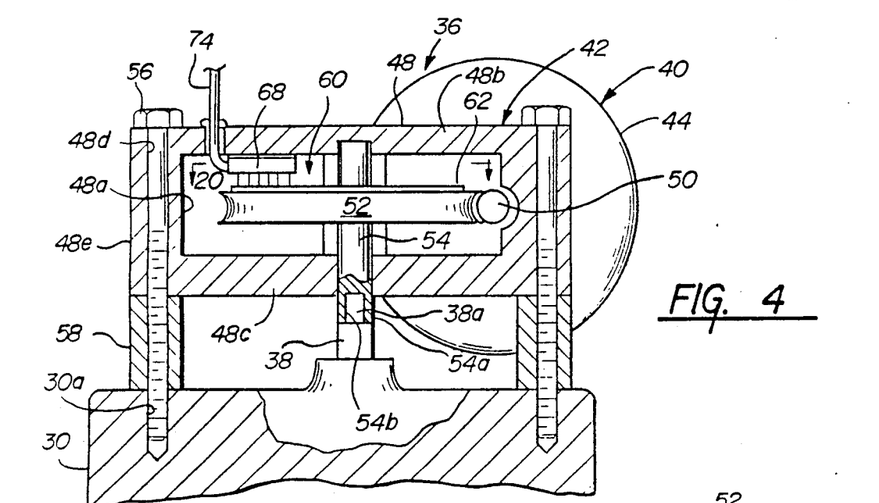
FIG. 4 is a cross-sectional view of a power module utilized in the invention control system.

As seen in FIG. 4, transmission 30 includes a mode select shaft 38 having a free upper end positioned above the housing of the transmission and operable in response to rotation of the shaft to operate internal devices within the transmission to position the transmission in a plurality of transmission shift modes such as park, neutral, drive, etc.

Power module 36 is adapted to be bolted to transmission housing 30 in proximity to mode select shaft 38 and includes a DC electric motor 40 and a speed reduction unit 42.

Motor 40 is a direct current motor having, for example, an output torque rating of 200-inch pounds and includes a housing 44 and an output shaft (not visible in FIG. 4).

Figure 5:
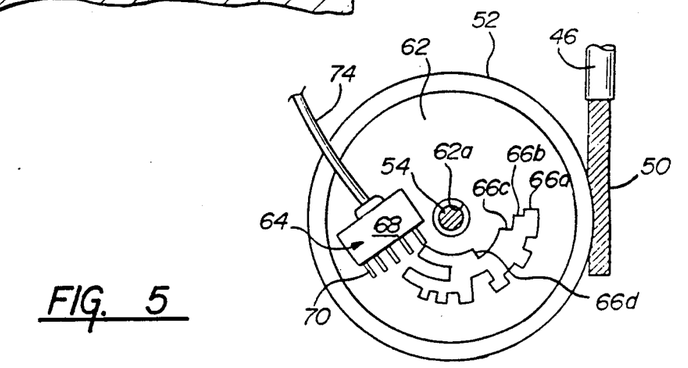
FIG. 5 is a view taken on line 5—5 of FIG. 4.
Figures 6, 7, 8, 9:
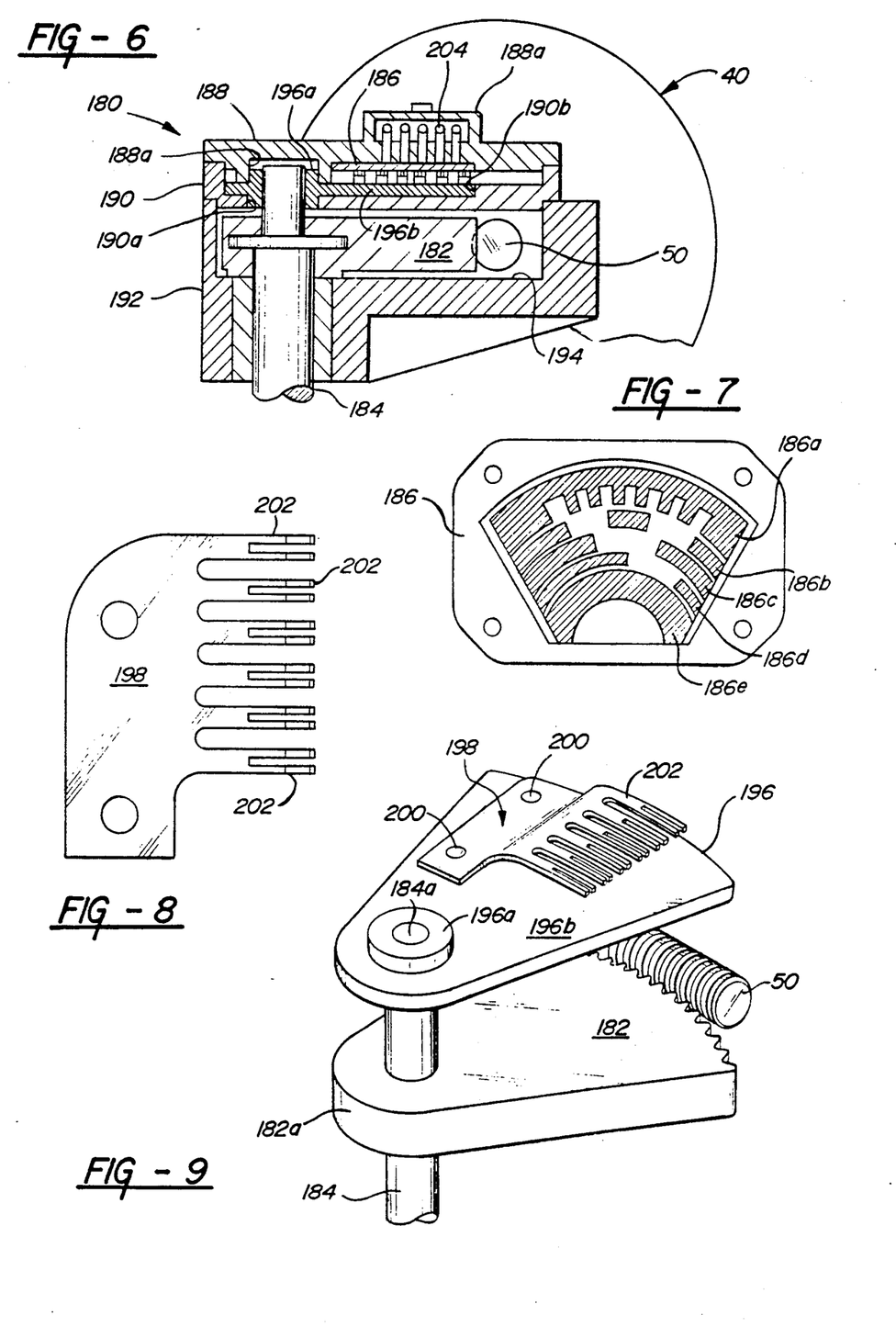
FIGS. 6-9 are views of a modified form of power module.

Speed reduction unit 42 includes a housing 48 fixedly secured to motor housing 44 and defining an internal cavity 48a; a worm gear 50 formed as a coaxial extension of the motor output shaft 46, as seen in FIG. 5 and extending into cavity 48a; a worm wheel 52 positioned in cavity 48a and driven by worm gear 50; and an output shaft 54 driven by worm wheel 52, journalled in housing walls 48b and 48c, and including a free lower end 54a positioned outside of and below housing wall 48c. Shaft lower end 54a includes a D-shaped opening 54b for driving coupling receipt of the D-shaped upper end portion 38a of mode select shaft 38.

Power module 36 is mounted on the upper face of transmission housing 30 by a plurality of bolts 56 passing downwardly through bores 48d in lug portions 48e of reduction unit housing 48 and downwardly through spacers 58 for threaded receipt in tapped bores 30a in transmission housing 30. In assembled relation, reduction unit output shaft 54 is coaxially aligned with mode select shaft 38 and D opening 54b in reduction unit shaft lower end 54a telescopically receives D-shaped upper end 38a of mode select lever 38 so that actuation of motor 40 acts through worm shaft 50, worm wheel 52, and reduction unit output shaft 54 to drive transmission mode select shaft 38.

Power module 36 further includes an encoder assembly 60, seen in FIGS. 4 and 5, operative to sense the instantaneous shift position of the transmission and generate an encoded signal representative of the sensed shift position.

Encoder assembly 60 includes an encoder wheel 62 and a pickup device 64. Encoder wheel 62 may be formed for example of a suitable plastic material and is secured to the upper side face of worm wheel 52 within reduction unit housing chamber 48a. Encoder wheel 62 includes a central aperture 62a passing reduction unit output shaft 54 and further includes code indicia 66 provided on the exposed face of the wheel and arranged along four arcuate indicia tracks 66a, 66b, 66c and 66d centered on the center line of the encoder wheel.

Pickup device 64 includes a plastic body member 68 mounting a plurality of flexible resilient contact fingers 70 for respective coaction with indicia tracks 66a, 66b, 66c and 66d. In addition to the four, fingers 70 for respective engagement with the four indicia tracks, a fifth finger is provided to provide a ground for the system. A lead 72 from motor 40 and a lead 74 from pickup device 64 are combined into a pintype plug 76 (FIG. 1).

Plug 76 is adapted for plugging coaction with a plug 80 connected to wires 82 and 84 corresponding respectively to wires 74 and 72, and wires 82 and 84 are connected to a logic control unit 86 which may be mounted for example within the vehicle instrument panel 10. Logic control unit 86 may be constructed for example as a programmable logic array or a gate array or, preferably, may be constructed as a programmed microprocessor circuit. As is explained in more detail in copending U.S. patent application Ser. No. 108,812, assigned to the assignee of the present invention, the logic control unit may function on the basis of Boolean equations which can be embodied in the logic circuits of a programmable microprocessor circuit. Those skilled in the art will understand that it is equally possible to perform the same Boolean operations with a programmable logic array or gate array.

The invention control system also includes a push button module 88, a desired-gear encoder 90, a speed sensor 92, and an analog-to-digital speed decoder 94.

Push button module 88 includes a plurality of push buttons 96 positioned in vertically spaced relation in the front face of the module and corresponding to the available transmission shift modes. Specifically, buttons 96 include buttons corresponding to park, reverse, neutral, overdrive, drive, second and first shift positions for the transmission. The specific output from push button module 88, as determined by the specific button depressed by the vehicle operator, is transmitted to desired-gear encoder 90 which functions in known manner to generate a signal for transmission to logic control unit 86 with the specific transmitted signal corresponding, in coded language, to the specific gear selected by operator depression of the specific push button of the push-button module.

Speed sensor 92 functions in known manner to provide analog information with respect to the instantaneous speed of the vehicle and analog-to-digital speed decoder 94 receives the analog input from speed sensor 92 and generates a plurality of desired-speed signals, for example, MPH3, MPH7, MPH20, and MPH30 for transmission to logic control unit 86. Analog to digital speed decoder 94 produces each speed signal MPH3, MPH7, MPH20 and MPH30 as a digital signal of a first type when the analog information from speed sensor 92 indicates a vehicle speed less than a corresponding predetermined vehicle speed, and as a digital signal of the opposite type when the analog information from speed sensor 92 indicates a vehicle speed greater than the corresponding predetermined vehicle speed. The plurality of speed signals generated by speed decoder 94 provide a plurality of threshold vehicle speed signals for use by the logic control unit in deciding whether a requested shift is allowable in view of the instantaneous speed of the vehicle. The selected threshold vehicle speed signals will of course vary depending upon the particular vehicular application.

In the general operation of the electrical shift control system, a signal from the operator, as originated by depression of the appropriate push button 96 of the push-button module 88, is relayed to the desired-gear encoder 90 and thence to the logic control unit 86 which compares the desired shift signal to the present-gear encoder signal as provided from encoder 60 via line 74 and, if the desired signal differs from the present signal and the threshold speed signal MPH3, MPH7, MPH20 and MPH30 being supplied by speed decoder 94 indicates that the desired shift is permissible, transmits a signal through line 72 to motor 40 to rotate the motor in a clockwise or counterclockwise direction and thereby rotate mode select shaft 38 of the transmission to shift the transmission to the desired position. Further details of the manner in which pushbutton module 88, power module 36, logic control unit 86, speed sensor 92, speed decoder 94, and desired gear encoder 90 coact to achieve the shifting of the transmission in accordance with the requested signals as provided by operator input to the push-button module are disclosed in co-pending application Ser. No. 108,812.

In accordance with one aspect of the invention control system, means are provided to preclude inadvertent locking of the steering column of the vehicle with the vehicle in motion.

Figure 2:
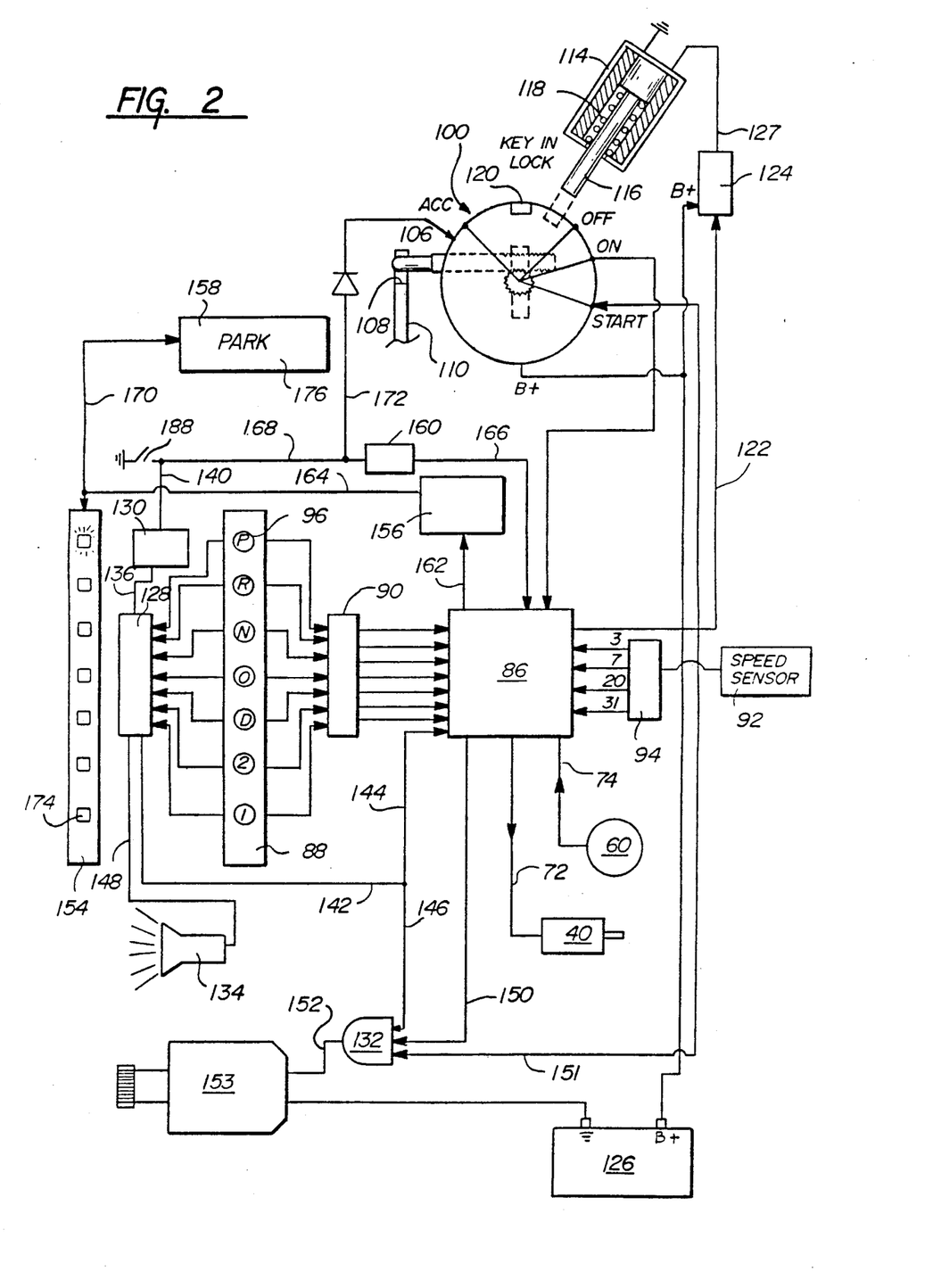
FIG. 2 is a block diagram of the control system of FIG. 1.

As best seen in FIGS. 1 and 2, the motor vehicle, in accordance with standard practice, is provided with an ignition switch 100 having standardized positions. Specifically, ignition switch 100, proceeding in clockwise fashion as viewed in FIG. 2, has an accessory position, a key-in/lock position, an off position, an on position, and a start position. The ignition switch also includes, in accordance with standard practice, means to lock the steering column when the ignition switch is moved to the key-in/lock position. Specifically, as the key 102 is rotated in the ignition switch to turn the tumbler of the switch, a shaft 104 is concomitantly rotated. Shaft 104 provides the pinion of a rack and pinion unit with the rack comprising a pin 106 moved into and out of engagement with a series of circumferentially spaced notches 108 in a disk 110 arranged to rotate with the steering column 112 of the vehicle so that the steering column is precluded from rotation with the pin 106 in its advanced position in engagement with a slot 108. The described system functions in known manner to lock the steering column in response to movement of the key 102 to the key-in/lock position of the ignition switch and functions in known manner to unlock the column in response to movement of the key and ignition switch to the off position. It will be understood that the column locking arrangement is seen schematically and in somewhat simplified form in FIG. 1. Specifically, in actuality, the rack and pinion unit is provided with a lost motion, spring loaded movement so that if pin 106 does not index with a slot 108 in response to movement of the key to the key-in/lock position, the pin is spring loaded against the disk 110 so that when the wheel and disk are thereafter turned slightly, the pin will move into the next slot and lock the steering wheel.

In accordance with the invention, means are provided to preclude movement of the ignition switch to the key-in/lock position when the vehicle is moving in excess of a predetermined maximum speed such, for example, as 3 miles per hour. This is accomplished according to the invention by providing a solenoid 114 in proximity to the ignition switch with its plunger 116 normally biased by a spring 118 to a position clear of the path of movement of the ignition switch but movable in response to energization of the solenoid downwardly to the dotted line position of FIG. 2 wherein it blocks movement of the ignition from the off to the key-in/lock position by blockingly interengaging a suitable lug or other blocking means 120 provided on the ignition switch and rotating with the ignition switch. Specifically, solenoid 114 is energized in response to a trigger signal from logic control unit 86 via lead 122. The signal conveyed via lead 122 is a "not in park" signal; that is, as long as the logic control unit 86 determines via the input from present-gear encoder 60 via line 74 that the transmission is not in park, a signal is transmitted on lead 122 to energize the solenoid so that the plunger of the solenoid remains in a blocking position to prevent movement of the ignition switch from the on or off position to the key-in/lock position. Since the threshold signal provided by speed decoder 94 corresponding to permissibility to shift the transmission to park is in the order of three miles per hour (threshold signal MPH3), the system in effect functions to preclude movement of the ignition switch to the key-in/lock position in response to a sensed vehicle speed in excess of the predetermined threshold value for permissible shifting into park, for example, 3 miles per hour. As indicated, the signal on lead 122 is a trigger signal and is fed to a field effect transistor 124 which is connected to the positive terminal of the vehicle battery 126 so that vehicle battery voltage is supplied by a lead 127 to energize solenoid 114 and maintain the plunger 116 in a blocking position in so long as lead 122 continues to provide a "not in park" signal. Logic control unit 86, as more fully explained in co-pending application Ser. No. 108,812, functions to shift the transmission to park automatically in response to movement of the ignition switch from the on position to the off position in so long as the threshold speed signal being supplied at that instant by speed decoder 94 indicates that such a shift is permissible, that is, indicates that the vehicle speed is below 3 miles per hour. Thus, as a practical matter, in the normal operation of the vehicle, the plunger of the solenoid is retracted by the spring 118 during starting of the vehicle since lead 122 at that time is not providing a "not in park" signal and does not provide such a signal until the vehicle is started and the transmission is shifted to any gear other than park. At that time a "not in park" signal is provided to field effect transistor 124 via lead 122 to energize the solenoid and move the solenoid plunger 116 into a blocking position with respect to the lug 120 of the ignition switch so that, as the vehicle is thereafter driven in the transmission drive gears, the plunger 116 precludes inadvertent movement of the ignition switch to the key-in/lock position, such for example as by an uncontrolled child or as by rambunctious occupant movement in the vicinity of the ignition switch. As the vehicle is brought to a stop in the normal course of operation and the ignition switch is moved from on to off, the logic control unit 86 functions automatically to shift the transmission to park so that the "not in park" signal in lead 122 is no longer present and the solenoid is deenergized to allow the spring 118 to move the plunger 116 to a retracted position and allow movement of the ignition switch from the off to the key-in/lock position so as to lock the steering column.

In accordance with another aspect of the invention control system, the existing electric shift mechanism is utilized to provide an effective anti-theft deterrent for the vehicle. Specifically, the anti-theft system is provided by a sequential logic circuit 128, a timer 130, an AND gate 132, and an alarm 134.

Sequential logic circuit 128 is connected to push-button module 88 and specifically receives signals from module 88 coded to correspond to the particular push button depressed by the operator. Sequential logic circuit 128 is connected to timer 130 by a conduit 136 and timer 130 is in turn connected to a door/door handle switch 138 by a lead 140. Switch 138 may be actuated by opening of the vehicle driver door 18 or by movement of the door handle 20 (FIG. 3). Logic circuit 128 is also connected via lead 142 to a lead 144 extending to logic control unit 86 and to a lead 146 extending to AND gate 132. A further output lead 148 from sequential logic circuit 128 extends to alarm 134 which may be in the form of a horn suitably positioned in the engine compartment of the vehicle. AND gate 132 is also connected by a lead 150 to logic control unit 86, by a lead 151 to the start position of the ignition switch and by a lead 152 to the vehicle starter motor 153.

Sequential logic circuit 128 is operable in known manner to generate a coded anti-theft signal in response to receipt of an appropriate signal from push-button module 96. For example, sequential logic circuit 128 may respond to a three-digit signal from module 96 with the signal consisting of a predetermined combination of push buttons (i.e., P, R, N, 0, D, 2 or 1) depressed in a predetermined sequence. For example, sequential logic circuit 128 may respond to the code signal 2PN as provided by the vehicle operator to generate the required anti-theft code signal. The sequential logic circuit 128 functions to deliver a shift-enable signal via leads 142 and 144 to the logic control unit 86 and a start-enable signal via leads 142 and 146 to AND gate 132, or an alarm signal via lead 148 to horn 134.

Specifically, when door 18 or door handle 20 is suitably actuated by the vehicle operator as the operator enters the vehicle passenger compartment, timer 130 is started and will run, for example, for a period of between 15 and 30 seconds. During this time frame, the vehicle operator must punch in the specific predetermined anti-theft code sequence via push buttons 96 of the push-button module 88 so as to allow the sequential logic circuit 128 to issue a shift-enable signal to the logic control unit 86 via lead 144 and deliver a start-enable signal via lead 146 to AND gate 132.

Logic control unit 86 is programmed so as not to permit any shifting of the vehicle, irrespective of commands received from desired-gear encoder 90, unless and until a shift-enable signal is received via lead 144 from sequential logic circuit 128. Further, AND gate 32 is in the starter motor circuit and will not permit starting of the vehicle, despite movement of the ignition switch to the start position, unless the AND gate 32 is also receiving a start-enable signal from sequential logic circuit 128 via lead 146 and is further receiving a park-/neutral signal from lead 150 indicating that the transmission is in a neutral or park position. Once the operator has punched in the proper predetermined anti-theft code sequence, the sequential logic circuit 128 functions to allow starting of the vehicle and subsequent shifting of the vehicle.

If the proper anti-theft code is not punched in within the time frame as determined by timer 130, sequential logic circuit 128 generates an output alarm signal on line 148 to horn 134 to actuate the horn as a warning that an attempt is being made to steal the vehicle. The operator may still punch in the proper predetermined anti-theft code sequence after the horn is sounded and sequential logic circuit 128, upon receipt of the proper predetermined anti-theft code sequence from push-button module 88, will terminate the alarm signal to the horn 134 and deliver the shift enable and start enable signals to the logic control unit 86 and the AND gate 32 respectively.

According to a further aspect of the invention, means are provided to continuously display the instantaneous position of the transmission at all appropriate times and in a manner to clearly apprise the operator of the position of the transmission. The transmission display feature of the invention is provided by a present gear indicator 154, a present gear indicator driver module 156, an instrument panel display 158 preferably of the vacuum fluorescent type, and a timer 160.

Present gear indicator driver module 156 is connected to logic control unit 86 via lead 162 and is in turn connected to present gear indicator module 154 via lead 164. Timer 160 is connected by a lead 166 to logic control unit 86 and by a lead 168 to door/door handle switch 138. A lead 170 connects instrument panel VF display 158 to present gear indicator module 154 and a lead 172 connects lead 168 to ignition switch 100. Lead 172 provides a "key-in" signal and, specifically, provides a positive signal at any time that the key is inserted in the ignition switch irrespective of the position of the ignition switch.

Present gear indicator module 154 is physically positioned adjacent push-button module 88 and includes a plurality of lights 174 corresponding in number to the push buttons 96 of the push-button module with a light 174 positioned immediately adjacent each of the push buttons 96 of the push-button module.

During normal vehicle operation, present gear indicator driver module 156 receives an appropriate coded signal from logic control unit 86 via lead 162 representative of the present transmission position and transmits an appropriate driver signal via lead 164 to present gear indicator module 154 to light the appropriate light 174 corresponding to the instantaneous position of the transmission. At the same time, present gear indicator driver module 156 transmits a drive signal via lead 164 and lead 170 to instrument panel display 158 which functions to display, in letter legend, the instantaneous position of the transmission in a window 176 provided in the instrument panel of the vehicle directly in the line of sight of the vehicle operator. That is, if the vehicle transmission is presently in park, the light 174 adjacent the park push button will be lit and the word "PARK" will be displayed in the window 176.

When the operator enters the vehicle and actuates the switch 138, timer 160 is started and a signal is transmitted to logic control unit 86 via lead 166 and thence via lead 162 to present gear indicator driver module 156 so as to generate an appropriate drive signal via lead 164 to present gear indicator module 154 to light the appropriate light 174 and generate a drive signal in lead 170 to display the appropriate letter legend in window 176, thereby to indicate the instantaneous position of the transmission. Since, as previously indicated, logic control unit 86 functions in response to movement of the ignition key to the off position to automatically shift the transmission to the park position, the transmission will be in the park position as the operator returns to the vehicle, and accordingly, the light 174 opposite the park push button will be lit and the instrument panel display 158 will display the word "PARK." This display of the appropriate lamp 174 and of the instrument panel display 158 will continue for the time determined by the timer 160 and the display will be terminated as the timer 160 runs out unless the key has been in the meantime inserted in the ignition switch so as to generate a key-in signal on line 172. The key-in signal generated in line 172 allows the appropriate lamp 174 as well as the instrument panel display 158 to remain powered up by the logic control unit despite the passage of the predetermined time as measured by the timer 160. When the vehicle in the normal course of operation is stopped and the ignition switch is moved to the off position and then to the key-in/lock position, as the key is thereafter removed from the ignition switch the key-in signal via line 172 is terminated and the timer 160 functions to continue to power up the appropriate lamp 174 and the instrument panel display 158 for the period of time determined by the setting of the timer 160. Since, as previously indicated, the logic control unit functions to automatically cycle the transmission to park upon movement of the ignition switch to the off position, the invention control system will continue to display the "PARK" legend in the instrument panel display 158 and will continue to light the lamp 174 opposite the park push button for the period of time determined by timer 160 following removal of the key from the ignition switch. The invention transmission display system will be seen to provide a clear and positive indication to the vehicle operator at all times of the instantaneous position of the transmission, both by virtue of the particular lamp 174 that is lit in the present gear indicator module 154 and by virtue of the specific legend displayed in the instrument panel display 158, further functions to provide an indication and an assurance to the operator as he is leaving the vehicle that the transmission has in fact cycled to park and is therefore safe to leave, and further provides an indication as the operator reenters the vehicle that the transmission is in fact in the park position.

In the modified power module 180 seen in FIGS. 6-9, the motor 40 drives worm gear 50, as in the embodiment of FIGS. 4 and 5, but the worm wheel 52 is replaced by a worm gear segment 182 drivingly connected at one end 182a thereof to the gear reduction unit output shaft 184 and the encoder wheel 62 is replaced by a ceramic encoder plate 186 secured to the underface of a plastic housing lid member 188. Lid member 188 is suitably secured to the upper face of a cover member 190 which in turn is suitably secured to the upper end of the main body member 192 of the gear reduction unit housing. Cover 190 and main body housing 192 coact to define a reduction unit housing chamber 194 within which worm gear 50 and worm gear segment 182 are received. Power module 180 further includes a segment plate 196 including a hub portion 196a by which one end of the segment plate is fixedly secured to the upper end 184a of the reduction unit output shaft in angular correspondence to gear segment 182 so that the segment plate 196 turns about the axis of shaft 184, in unison with gear segment 182, in response to actuation of motor 40. Hub portion 196a of segment plate 196 is journalled in an aperture 190a of cover member 190 with its upper end journalled in a bore 188a in the lower face of lid member 188. The main body portion 196b of segment plate 196 is guided in a suitable arcuate cutout 190b in the upper face of cover member 190. Power module 180 further includes a finger plate 198 secured as by rivets 200 to the upper face of main body portion 196b of segment plate 196 and defining a plurality of bifurcated spring fingers 202 for respective tracking engagement with indicia tracks 186a, 186b, 186c and 186d defined on the lower face of encoder plate 186. Plate 198 defines five fingers 202 with four of the fingers intended for respective tracking engagement with the four indicia tracks 186a, 186b, 186c and 186d and the fifth finger being provided to coact with a ground track 186e to provide a ground for the system. Lid 188 further defines an integral plug housing 188a for receipt of the upper ends of five connector pins 204 respectively connected at their lower ends to the five tracks 186a, 186b, 186c, 186d and 186e so that a suitable connector may be inserted into housing 188a for contact with fingers 202 so as to receive information from tracks 186a–186d, with respect to the present position of the transmission, for transmittal to logic control unit 86. It will be understood that indicia tracks 186a, b, c and d have an arcuate configuration and are centered on the axis of output shaft 184 so that the individual tracks maintain contact with the respective fingers 202 as the segment plate 196 and fingers 202 are rotated about the axis of output shaft 184 in response to actuation of motor 40. Encoder 180 functions in all other respects in a manner similar to the functioning described with respect to encoder 86 of the FIGS. 4 and 5 embodiment.

Whereas preferred embodiments of the invention have been illustrated and described in detail, it will be apparent that various changes may be made in the disclosed embodiment without departing from the scope or spirit of the invention.

We claim:

1. A control system for a motor vehicle of the type including a steering system having a steering column, an ignition switch having an "on" position and a "key in/lock" position, and means operative in response to movement of said ignition switch to the "key in/lock" position to lock the steering column, said control system comprising:
   (A) sensor means operative to sense the vehicle speed and generate a speed signal; and
   (B) control means receiving said speed signal and operative in response to a sensed vehicle speed in excess of a predetermined speed to preclude movement of said ignition switch to the "key in/lock " position.

2. The control system according to claim 1 wherein:
   (C) said control means includes blocking means movable into and out of the path of movement of said ignition switch in response to the received speed signal.

3. A control system according to claim 2 wherein:
   (D) said blocking means comprises an electrical actuator which is actuated and deactuated in response to the received speed signal.

4. A control system according to claim 3 wherein said actuator comprises a solenoid energized and deenergized in response to said speed signal and having its plunger arranged to move into and out of said path of movement.

5. A control system according to claim 2 wherein the vehicle includes an automatic transmission of the type including a transmission of state of "Park" and the ignition switch includes an "off" position between the "key in/lock" position and the "on" position and wherein:
   (D) said control means comprises a control logic receiving said speed signal;
   (E) said control logic is operative in response to movement of the ignition switch to the "off" position to shift the transmission to "Park" if the received speed signal indicates a vehicle speed no greater than said predetermined speed; and
   (F) said blocking means is moved out of the path of movement of said ignition switch in response to shifting of the transmission to the transmission state of "Park", whereby to allow movement of said ignition switch to the key in/lock position to lock the steering column.

6. A control system according to claim 5 wherein:
   (G) said blocking means comprises a solenoid mounted in proximity to said ignition switch and having its plunger moved into and out of said path.

7. A control system for a motor vehicle of the type including a transmission having a plurality of shift positions, said control system including:
   (A) a transmission shift assembly including a plurality of operator-selected positions corresponding respectively to said transmission shift positions;

(B) generator means operative in response to operator selection of a shift assembly position to generate an operator signal representative of the selected shift assembly position;

(C) operator-actuated means for generating an anti-theft code signal; and (D) control means, including a control logic receiving said operator shift signals and said anti-theft code signal, operative upon receipt of an operator-selected position signal and said anti-theft code signal to shift said transmission to the shift position corresponding to the operator-selected position and inoperative to shift the transmission in the absence of recept of said anti-theft code signal.

8. A control system according to claim 7 wherein said motor vehicle further includes a starter circuit, including an ignition switch, to enable starting of the engine of the motor vehicle upon closing of the ignition switch and wherein:

(E) said control system is further operative to disable said starter circuit in the absence of said anti-theft code signal.

9. A control system according to claim 8 wherein:

(F) said shift assembly includes a push-button module including a push-button corresponding to each transmission shift position; and (G) said operator-actuated means for generating an anti-theft code signal includes said push-button module in combination with a sequential logic circuit connected to said push-button module and operative in response to operator depression of selected push-buttons in a predetermined sequence to generate said anti-theft code signal.

10. A control system according to claim 7 wherein said motor vehicle includes a passenger compartment closure system requiring one or more operator steps to enter the vehicle passenger compartment and wherein:

(H) said control system further includes alarm means activated upon failure of the operator to generate said anti-theft code signal within a predetermined time after operator performance of one or more of the steps required to enter the vehicle.

11. A control system according to claim 10 wherein:

(I) said alarm means comprises an audible alarm.

12. A control system according to claim 10 wherein the control system includes a timer started in response to operator performance of one or more of the steps required to enter the vehicle and operative to measure said predetermined time.

13. A control system for a motor vehicle of the type having an automatic transmission, a gear selector assembly operative to select a desired transmission position, an ignition switch having an "on" position and a "key removal" position, and a passenger compartment closure system requiring one or more operator steps to enter the vehicle passenger compartment, said control system comprising:

(A) indicator means operative when activated to display the instantaneous position of the transmission as selected by the gear selector assembly;

(B) means connected to said ignition switch and said indicator means operative to activate said indicator means when the ignition switch is in the "on" position or the "key removal" position;

(C) time delay means connected to said ignition switch and said indicator means operative to activate said indicator means for a predetermined period of time after movement of the ignition switch to the "key removal" position and removal of the key; and (D) means operative in response to operator performance of one or more of the steps required to enter the vehicle to activate said indicator means.

14. A control system according to claim 13 wherein the transmission has a transmission state of "Park" and said ignition switch has an "off" position and wherein:

(D) said control system further includes means operative to shift the transmission to the transmission state of "Park" in response to movement of the ignition switch to the "off" position;

(E) said indicator means is operative with the vehicle ignition in the "off" position so that the transmission stat of "Park" is displayed when the ignition switch is moved to the "off" position, continues to be displayed as said ignition switch is moved to the "key removal" position, is displayed for said predetermined period of time after removal of the key, and is again displayed in response to operator performance of one or more of the steps required to enter the vehicle.

15. A control system according to claim 14 wherein:

(F) said time delay means are further operative to maintain said indicator means in an activated state for a predetermined entry time following operator performance of one or more of the steps required to enter the vehicle, whereby the transmission state of "Park" is displayed for said predetermined entry time and will remain displayed provided the key is inserted in the ignition within the predetermined entry time.

16. A control system according to claim 15 wherein:

(G) said indicator means is operative when activated to display the instantaneous position of the transmission in a window in the instrument panel of the vehicle.

17. A control system according to claim 15 wherein:

(G) said indicator means is operative when activated to display the instantaneous position of the transmission by a visual signal adjacent the selected position of the gear selector assembly.

18. A control system according to claim 15 wherein:

(G) said indicator means is operative when activated to display the instantaneous position of the transmission in a window in the instrument panel of the vehicle as well as to further display the instantaneous position of the transmission by a visual signal adjacent the selected position of the gear selector assembly.

19. A control system according to claim 18 wherein:

(H) said gear selector assembly is a pushbutton assembly with a push-button corresponding to each position of the transmission; and (I) said visual signal comprises a separate light in association with each push-button.

20. A control system for a motor vehicle of the type having an automatic transmission having a plurality of shift positions including the transmission state of "Park" and a ignition switch having an "on " position, an "off" position, and a "key " removal position, said control system comprising:

(A) means operative to shift the transmission to the transmission state of "Park" in response to movement of the ignition switch from the "on" to the "off" position; and (B) indicator means operative with the vehicle ignition in the "on", "off", or "key removal " position to display the instantaneous position of the transmission so that the transmission state of "Park" is displayed as the ignition switch is moved from the "on" to "off" position, continues to be displayed as the ignition switch is moved to the "key removal" position, and ceases to be displayed at some time after removal of the key from the ignition switch.

21. The control system according to claim 20 wherein:
(C) said control system further includes time delay means operative to maintain said indicator means in an activated state for a predetermined time following removal of the key from the ignition switch so that the transmission state of "Park " continues to be displayed for said predetermined time following removal of the key.

22. A control system according to claim 21 wherein said vehicle includes a passenger compartment closure system requiring one or more operator steps to enter the vehicle passenger compartment and wherein:
(D) said time delay means is further operative in response to operator performance of one or more of the steps required to enter the vehicle to activate said indicator means for a predetermined entry time so that said transmission state of "Park" is displayed for said predetermined entry time.

23. A control system for a motor vehicle of the type having a transmission including a plurality of shift positions, said control system including:
a gear selector assembly adapted to be positioned in the passenger compartment of the motor vehicle and including gar selector means having respective select positions corresponding to each position of the transmission;
selectively activatable indicator means respectively associated with the select positions of said gear selector means; and
control means sensing the instantaneous position of the transmission and operative to selectively activate the indicator means associated with the select position corresponding to the instantaneous transmission position and to provide a further display of the instantaneous transmission position at a location remote from said gear selector assembly.

24. A control system according to claim 23 wherein:
said indicator means comprises a plurality of indicator lamps respectively associated with the select positions of said gear selector means;
said control means is operative to illuminate the indicator lamp associated with the select position corresponding to the instantaneous transmission position; and
said further display comprises a letter legend display.

25. A control system according to claim 24 wherein: said gear selector means comprises a plurality of push buttons corresponding respectively to the transmission shift position;
said indicator lamps are respectively associated with said push buttons; and
said further display comprises a letter legend display in the vehicle instrument panel forwardly of the vehicle operator.

26. A control system according to claim 24 wherein:
said letter legend display is at a location substantially directly in the line of sight of the vehicle operator.

27. A control system for a motor vehicle of the type including a transmission having a plurality of states including the state of "Park", a steering system having a steering column, an ignition switch having an "on" position and a "key-in/lock" position, and means operative in response to movement of the ignition switch to the "key-in/lock" position to lock the steering column, said control system comprising:
means sensing the transmission state and operative to generate transmission state signals corresponding respectively to the various transmission states; and
control means receiving said transmission state signals and operative to preclude movement of said ignition switch to the "key-in/lock" position in the absence of a transmission state signal corresponding to the transmission state of "Park".

28. A control system according to claim 27 wherein:
said control means includes blocking means movable into and out of the path of movement of said ignition switch in response to the received transmission state signals.

29. A control system according to claim 28 wherein:
said blocking means comprises an electrical actuator which s actuated and deactuated in response to the received transmission state signals.

30. A control system according to claim 29 wherein said actuator comprises a solenoid energized and deenergized in response to said transmission state signals and having its plunger arranged to move into and out of said path of movement.

31. A control system according to claim 30 wherein:
the plunger of said solenoid is moved into said path of movement in the absence of a "Park" transmission state signal and moved out of said path upon receipt of a "Park" transmission state signal.

32. A control system according to claim 27 wherein:
said control means further receives vehicle speed signals and is operative in response to receipt of a predetermined threshold speed signal to shift the transmission to the transmission state of "Park" upon movement of the ignition switch from the "on" position toward the "key-in/lock" position, whereby to allow movement of the ignition switch to the "key-in/lock" position.

* * * * *